United States Patent

Deimel

[11] Patent Number: 5,956,882
[45] Date of Patent: Sep. 28, 1999

[54] SOLAR ICE CAP

[75] Inventor: Bradley M. Deimel, Waukesha, Wis.

[73] Assignee: Bradley M Deimel, Waukesha, Wis.

[21] Appl. No.: 08/887,444

[22] Filed: Jul. 2, 1997

[51] Int. Cl.$^6$ .................................................. A01K 69/00
[52] U.S. Cl. ........................................ 43/4; 43/4.5
[58] Field of Search .................................. 43/4, 4.5, 17

[56] References Cited

U.S. PATENT DOCUMENTS

| | | | |
|---|---|---|---|
| 2,747,569 | 5/1956 | Holm | 43/4 |
| 2,883,784 | 4/1959 | Obernolte | 43/4 |
| 3,578,748 | 5/1971 | Hurd | 43/44.9 |
| 3,694,950 | 10/1972 | Maier | 43/4 |
| 3,813,891 | 6/1974 | Wootten | 43/4 |
| 4,253,262 | 3/1981 | Johnson | 43/17 |
| 4,823,494 | 4/1989 | Waterman | 43/17 |
| 4,845,878 | 7/1989 | Hackel | 43/17 |
| 4,945,668 | 8/1990 | Keller | 43/17 |
| 4,953,317 | 9/1990 | Ruchel | 43/17 |
| 5,044,108 | 9/1991 | Rinehart | 43/17 |
| 5,101,591 | 4/1992 | Frazier | 43/17 |

*Primary Examiner*—Jack W. Lavinder

[57] ABSTRACT

A device used to maintain a hole formed in the ice for ice fishing. When placed over the hole, this invention forms a therm-protection between the hole and the surrounding harsh environment protecting the open water in the hole from crystallizing and ultimately freezing over. This device utilizes the natural temperature differences between the unfrozen water and the surrounding air and combines it with emitted radiation (naturally, electrically, chemically, or with petroleum-based products). Examples of this emitted radiation are the sun, a battery-powered heater, light source and a propane or similar type heater. An example of a chemical reaction device would be a hand warmer. Addition of any or all of the above will increase the efficiency of this invention. This device allows for adaptability to fishing conditions and fishing devices ranging from a simple rod and reel to complicated fish locators as well as a variety of tip-ups.

1 Claim, 1 Drawing Sheet

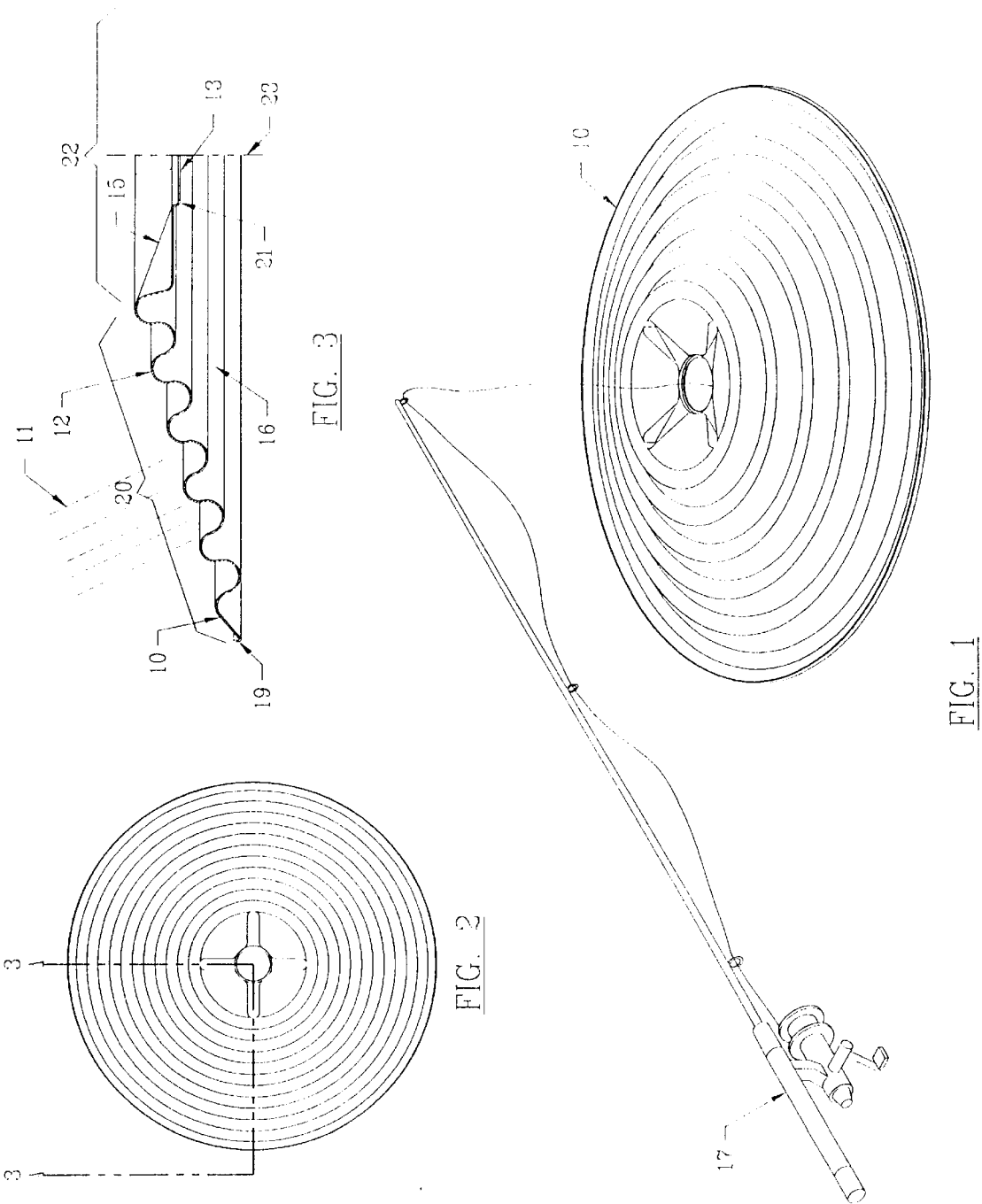

SOLAR ICE CAP

FIELD OF INVENTION

This invention relates specifically to ice fishing, a sport in which a person locates a spot on the ice where that person thinks fish may be present. Upon locating this spot, a hole is formed through the ice, and with the use of many devices all having a line and a hook on the end, the person proceeds to fish.

The problem is at freezing temperatures the water in the ice begins to crystallize in the hole. Typically the person will periodically remove the unwanted ice crystallization from the hole usually with a ladle-like device or sometimes with bare hands. If the crystallization is allowed to continue, the hole will ultimately freeze over.

This invention will significantly reduce the number of times a person will be required to remove unwanted ice from the hole. The invention is designed to cover the water in the hole and to provide the water with enough warmth to deter ice crystallizations. Its main form of energy sources is from the natural warming effect due to temperature differences between the air and the open unfrozen water in the hole and incorporates it with solar radiant heat when available. The invention also allows for a wide range of devices to be used in conjunction with this invention. The purpose is to increase the invention's efficiency.

The invention also is designed for adaptability to different types and styles of ice fishing equipment as well as fish location, bottom location and temperature devices.

Although the applicant cites prior patented articles including Hurd, U.S. Pat. No. 3,578,748; Maier, U.S. Pat. No. 3,694,950; Waterman, U.S. Pat. No. 4,823,494; Hackel U.S. Pat. No. 4,845,878; and Ruchel, U.S. Pat. No. 4,953,317, none of them disclose my invention.

Since consumption and test of this product by the applicant, the applicant has not found commercially acceptable or useable devices incorporating the concepts of his invention. These prior patented art references teach the concept of insulating the hole but do not incorporate the use of additional warming devices including the sun (solar energy) to heat trapped air. This design accepts various versions of fishing equipment and warming devices.

SUMMARY OF THE INVENTION

A device when placed over a hole formed in the ice used for ice fishing will reduce annoying ice crystallization from forming on the exposed water and ultimately creating sharp, jagged edges and the potential for fish line breakage. If crystallization is allowed to continue while fishing in temperatures at or below the water's freezing point and left unattended for prolonged period of time, the hole will ultimately become frozen solid capturing anything that extends through the hole such as a fishing line.

To minimize this effect, the invention's design characteristics are such that the device will make use of maximum size while maintaining minimal volume of air trapped inside. The device will cover the hole and protrude upwardly in a manner so as to maintain an air ratio that will not be greater than a device's ability to warm it above the freezing point. The device is designed to operate with one or more of the following heating devices: natural, electrical, chemical or petroleum-based products.

These devices located on, under, or in respect to this invention are characteristic to this invention. The design also allows the invention to be adaptable to all types of ice fishing devices and practices. An example ranges from a hook and line to a complicated fish activated device (tip-up) as well as devices used in locating fish or bottom contour. The material used in manufacturing the invention is to be of one having an insulating value yet allows external forces to have a warming effect emitted to the inside. This includes but is not limited to transparent or non-transparent plastic.

The color will be of any single or combination of colors known to man including black and/or white.

BRIEF DESCRIPTION OF THE DRAWING

FIG. 1 is a perspective view of a hole cover/hole maintenance device constructed in accordance with the principles of the present invention.

FIG. 2 is a top plan view of FIG. 1.

FIG. 3 is a sectional view taken in the plane indicated by Line 3—3 in FIG. 2.

DESCRIPTION OF REFERRED EMBODIMENT

As shown in FIG. 1, the subject ice fishing apparatus indicated generally at 10 is adapted for use on a frozen ice surface whereby a hole is formed and the subject apparatus 10 is placed directly over the hole in the ice.

The subject apparatus 10 is made of a material having an insulating value such as plastic, yet allows external forces to have a warming effect emitted to the inside 16. An example of this being solar radiation 11.

As persons versed in the art will appreciate, various other materials of other thermal conductivity may be utilized in practicing the subject invention, however, plastic has been determined to provide quite satisfactory results. The subject apparatus 10 is designed in a manner to accept various type and styles of fishing equipment 17 such as fish pole, tip ups, fish location, bottom contour, and temperature devices.

As shown in FIG. 3, the subject apparatus 10 is comprised of a dome shaped device consisting of a bottom concentric edge 19, a central axis 23, a recessed portion 22 and a series of hills and valleys 12 forming an upwardly sloping concentric undulating section 20 so as to make best use of solar radiation 11 and to transfer warmth to the inside of the device 10 while significantly reducing the volume of air 16 trapped within the device 10. The undulated section extends from the bottom concentric circular edge upwardly to a recessed portion 22. The recessed portion being formed by a concentric conical surface 15 sloping downwardly from the undulating section to a flat surface 21 which forms the bottom of the recess. The flat surface has a through hole 13 with the center of the through hole contiguous to the central axis of the dome shaped device.

As is illustrated in FIG. 3, room has been incorporated into the device to allow for various types of warming devices using various types of energy to warm the volume of air 16 within the device 10.

An example being a chemical reaction device such as a hand warmer. These devices placed under, on, or in respect the device 10 and will improve the efficiency of device 10 important for use on overcast or cooler days.

The device 10 accepts various types of lighting units used in adding visibility of the device. These illumination devices placed on, under or in respect to the device are meant to make visible or to show the location of the device 10. These illumination devices may or may not create a warming effect adding to the efficiency of device 10.

What is claimed is:

1. A disc shaped device having a central axis for covering an ice fishing hole to retard ice crystallization within the ice fishing hole comprising:

a concentric bottom edge for engaging the ice surrounding the ice fishing hole;

a concentric undulated section sloping upwardly from the bottom edge to a recessed portion;

a concentric conical surface forming the side of said recessed portion, said conical surface sloping downwardly from the undulated section to a flat circular surface which forms the bottom of said recess; and a through hole in said flat surface wherein the center of the through hole is contiguous with the central axis of the disc shaped device.

* * * * *